United States Patent
Jeong

(10) Patent No.: US 11,274,708 B2
(45) Date of Patent: Mar. 15, 2022

(54) CLUTCH FOR IN-WHEEL MOTOR

(71) Applicant: HYUNDAI MOBIS CO., LTD., Seoul (KR)

(72) Inventor: Ui Il Jeong, Yongin-si (KR)

(73) Assignee: HYUNDAI MOBIS CO., LTD.

( * ) Notice: Subject to any disclaimer, the term of this patent is extended or adjusted under 35 U.S.C. 154(b) by 0 days.

(21) Appl. No.: 17/132,744

(22) Filed: Dec. 23, 2020

(65) Prior Publication Data
US 2021/0364049 A1    Nov. 25, 2021

(30) Foreign Application Priority Data

May 21, 2020 (KR) .......................... 10-2020-0061024

(51) Int. Cl.
*F16D 13/18*    (2006.01)
*B60K 17/04*    (2006.01)
*B60K 17/02*    (2006.01)

(52) U.S. Cl.
CPC .............. *F16D 13/18* (2013.01); *B60K 17/02* (2013.01); *B60K 17/043* (2013.01)

(58) Field of Classification Search
CPC ........... F16D 13/18; F16D 13/10; F16D 13/16
See application file for complete search history.

(56) References Cited

U.S. PATENT DOCUMENTS

| | | | | |
|---|---|---|---|---|
| 2,949,040 | A | * | 8/1960 | Bixby .................. B60K 17/043 74/390 |
| 3,724,413 | A | * | 4/1973 | Duncan .................. B63B 59/02 114/220 |
| 2005/0077137 | A1 | * | 4/2005 | Nozaki ................. F16D 27/118 192/38 |
| 2014/0139009 | A1 | * | 5/2014 | Bindl .................... B60K 7/0007 301/6.5 |

FOREIGN PATENT DOCUMENTS

| | | |
|---|---|---|
| JP | 10-096437 | 4/1998 |
| JP | 2007-089238 | 4/2007 |
| KR | 10-0773153 | 11/2007 |
| KR | 10-2014-0006377 | 1/2014 |

OTHER PUBLICATIONS

Korean Office Action dated Nov. 9, 2021, issued to Korean Patent Application No. 10-2020-0061024.

* cited by examiner

*Primary Examiner* — Huan Le
(74) *Attorney, Agent, or Firm* — H.C. Park & Associates, PLC

(57) ABSTRACT

A clutch for an in-wheel motor includes a hub bearing coupled to a driving wheel and integrally rotated therewith, and formed in a cylindrical shape to provide a seating space therein; a drive shaft positioned in the seating space in a state of being spaced apart from an inner circumferential surface of the hub bearing, connected to a driving part to be rotated by rotational force of the driving part, and provided with a contact part on an outer circumferential surface of a first end of the drive shaft extended in a longitudinal direction; and a plurality of linings positioned inside the seating space on an outer side of the contact part and coupled to the hub bearing to be movable in a circumferential direction.

14 Claims, 7 Drawing Sheets

CLUTCH FOR IN-WHEEL MOTOR

CROSS REFERENCE TO RELATED APPLICATION

This application claims priority from and the benefit of Korean Patent Application No. 10-2020-0061024, filed on May 21, 2020, which is hereby incorporated by reference for all purposes as if set forth herein.

BACKGROUND

Field

Exemplary embodiments relate to a clutch for an in-wheel motor and, more particularly, to a clutch that is applied to a vehicle equipped with an in-wheel motor to transmit or block power of the motor.

Discussion of the Background

In compliance with the international demand for regulation enforcement of greenhouse gas reduction and for improvement of fuel efficiency of automobiles, research and development and commercialization of parts related to eco-friendly automobiles that generate driving force by using electric motors are actively being conducted in the automobile industry.

In particular, an electric vehicle (EV) using a motor as a main power source, a hybrid vehicle (HEV, PHEV, and FCEV) alternately using the motor as an auxiliary power source, and the others have been developed. In the case where a vehicle is driven using the motor, electric power may be regenerated when the vehicle is braked, and thus there is an advantage of recovering energy through regenerative braking.

Recently, a vehicle equipped with an in-wheel motor in which the motor is directly mounted on a driving wheel of the vehicle is under development. In the case of the in-wheel motor, individual drive of the driving wheels is made possible, so that it is easy to switch between 2WD mode and 4WD mode.

However, due to the characteristics of the in-wheel motor, the size of wheel radius must be maximally reduced to improve fuel efficiency, and a number of parts such as a motor, a brake, a speed reducer, and a suspension must be included inside the wheel, whereby there occurs limitations related to a packaging aspect of the in-wheel motor. Accordingly, in the case of the in-wheel motor, a clutch having a simplified structure is required.

The above information disclosed in this Background section is only for enhancement of understanding of the background of the invention and, therefore, it may contain information that does not constitute prior art.

SUMMARY

Exemplary embodiments of the present invention have been proposed to address this problem, and objectives of the present invention include providing a clutch for an in-wheel motor, the clutch being simplified in configuration in which a separate actuator is not included.

A clutch for an in-wheel motor according to the present invention for achieving the above objective includes a hub bearing coupled to a driving wheel and integrally rotated therewith, and formed in a cylindrical shape to provide a seating space therein; a drive shaft positioned in the seating space in a state of being spaced apart from an inner circumferential surface of the hub bearing, connected to a driving part to be rotated by rotational force of the driving part, and provided with a contact part on an outer circumferential surface of a first end of the drive shaft extended in a longitudinal direction; and a plurality of linings positioned inside the seating space on an outer side of the contact part and coupled to the hub bearing to be movable in a circumferential direction.

In the seating space, the plurality of linings may be capable of transitioning between a state in which inner circumferential surfaces thereof are in contact with an outer circumferential surface of the contact part and a state in which the contact therebetween is released.

Inner circumferential surfaces of the plurality of linings may be bent to correspond to an outer circumferential surface of the contact part so as to be in surface contact when contacting the outer circumferential surface of the contact part.

The clutch for the in-wheel motor may further include a plurality of connection links each having a first end rotatably coupled to the hub bearing and having a second end extended to the seating space and rotatably coupled to each of the plurality of linings.

The plurality of linings and the plurality of connection links may be disposed to be spaced out at equal intervals along the circumferential direction of the hub bearing.

Each second end of the plurality of connection links may be obliquely extended in a reverse direction of a driving direction of the drive shaft with respect to a direction from each first end of the plurality of connection links toward a rotation axis of the drive shaft.

The plurality of connection links may be coupled to the hub bearing at positions where each first end of the plurality of connection links is relatively moved along a driving direction of the drive shaft or a rotational direction of the hub bearing with respect to each second end of the plurality of connection links.

The clutch for the in-wheel motor may further include an elastic body applying elastic force to the plurality of linings in a direction moving toward the drive shaft.

The elastic body may be positioned inside the seating space and may apply the elastic force inward to the plurality of linings while surrounding the plurality of linings from outside.

The plurality of connection links may include a first connection link and a second connection link, which are obliquely extended respectively from each of the first ends to each of the second ends in opposite directions with respect to a direction toward a rotation axis of the drive shaft.

The first connection link and the second connection link may be disposed to be spaced apart from each other in the longitudinal direction in which the drive shaft is extended.

The plurality of linings may include a first lining and a second lining, and the first lining and the second lining may be disposed in the longitudinal direction in which the drive shaft is extended.

The clutch for the in-wheel motor may further include a first connection link having a first end rotatably coupled to the hub bearing and having a second end extended to the seating space and rotatively coupled to the first lining; and a second connection link disposed to be spaced apart from the first connection link in the longitudinal direction in which the drive shaft is extended, the second connection link having a first end rotatably coupled to the hub bearing, and having a second end extended to the seating space and rotatably coupled to the second lining.

The second end of the first connection link may be obliquely extended in a reverse direction of a driving direction of the drive shaft with respect to a direction from the first end of first connection link toward a rotation axis of the drive shaft, and the second end of the second connecting link may be obliquely extended in the driving direction of the drive shaft with respect to a direction from the first end of second connecting link toward the rotation axis of the drive shaft According to the clutch for the in-wheel motor of the present invention, there is an effect in that a hub bearing and a drive shaft are mechanically decoupled by being spaced apart from a contact part by centrifugal force in a section where the hub bearing rotates at high speed.

In addition, as a moment of inertia is generated in a direction opposite to the direction in which the drive shaft rotates, a lining is clamped to the contact part, thereby generating a self-servo effect and a wedge effect.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
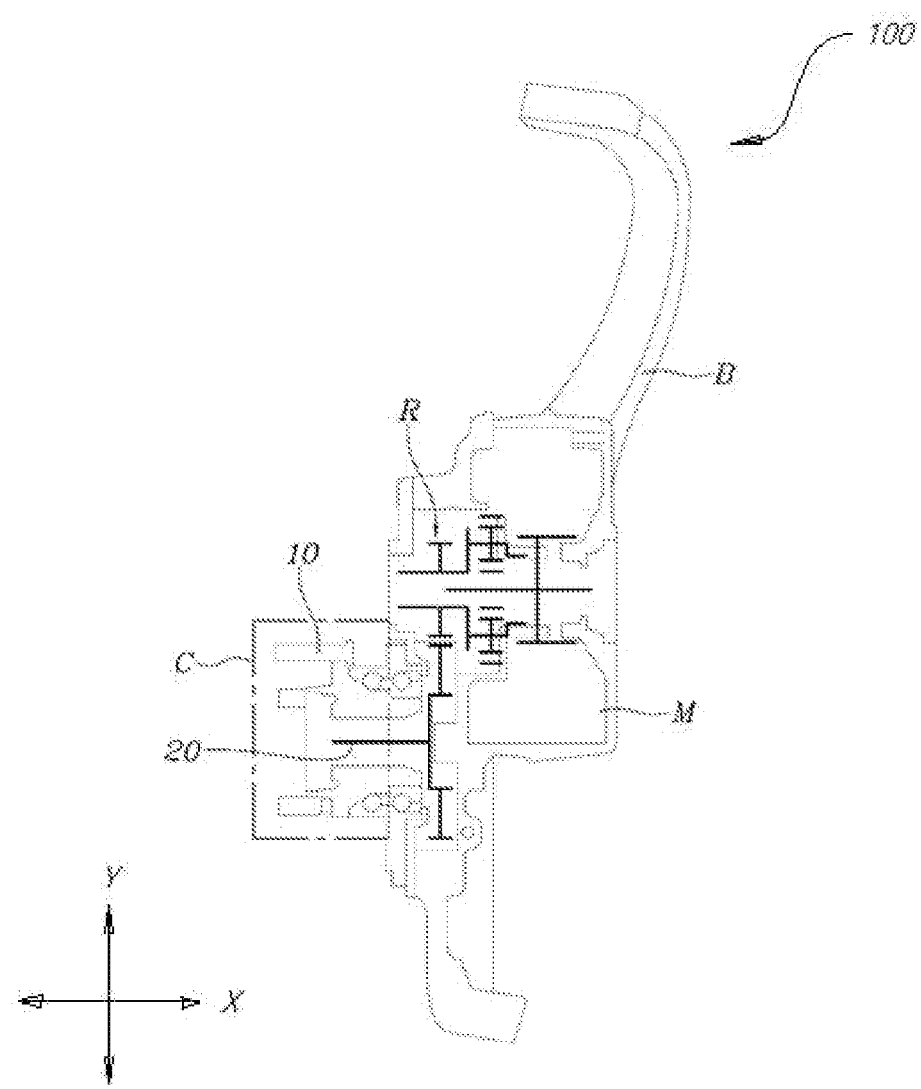
FIG. 1 is a cross-sectional view illustrating an in-wheel motor M system coupled to a clutch for an in-wheel motor according to an embodiments of the present invention.

The invention is described more fully hereinafter with reference to the accompanying drawings, in which embodiments of the invention are illustrated. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Specific structural and functional descriptions of the embodiments of the present invention disclosed herein are only for illustrative purposes of the embodiments of the present invention. The present invention may be embodied in many different forms. Therefore, the embodiments of the present invention should not be construed as limiting the present invention.

Because the embodiments of the present invention can be variously modified in many different forms, specific embodiments will be illustrated in the drawings and described in detail in the specification or application of the present invention. However, this is not intended to limit the embodiments in accordance with the concept of the present invention to a particular disclosed form. On the contrary, the present invention is to be understood to include all various alternatives, equivalents, and substitutes that may be included within the spirit and scope of the present invention.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "coupled" to another element, it can be directly coupled or connected to the other element or intervening elements may be present. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for the purpose of describing particular embodiments only and is not intended to be limiting. As used herein, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the inventive concepts, and will not be interpreted in an idealized or overly formal sense unless expressly so defined herein.

Hereinafter, exemplary embodiments of the present invention will be described in detail with reference to the accompanying drawings. Throughout the drawings, the same reference numerals will refer to the same or like parts.

Figure 2:
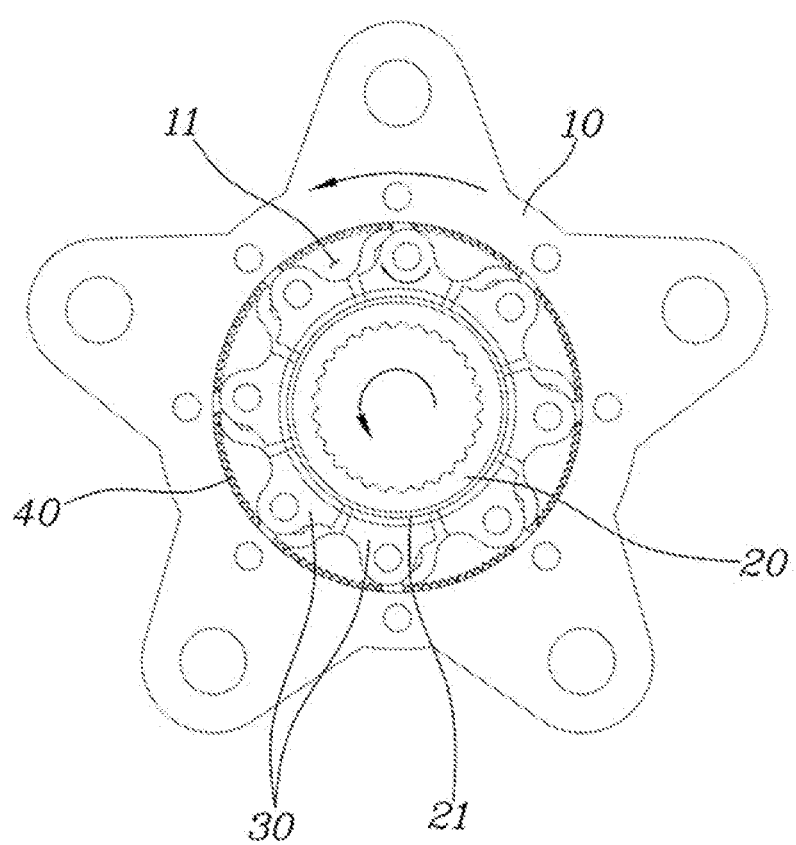
FIG. 2 is a view illustrating a state in which the clutch for the in-wheel motor is coupled according to embodiments of the present invention.
Figure 3:
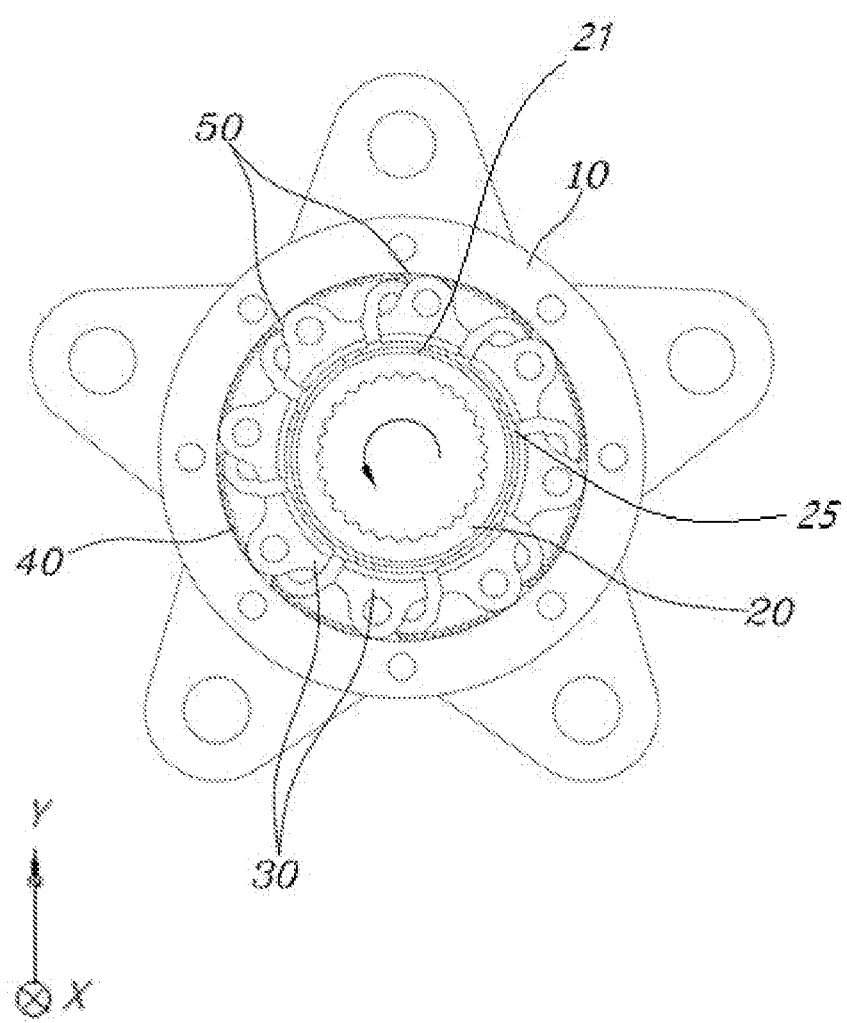
FIG. 3 is a view illustrating a state in which the clutch for the in-wheel motor is released according to embodiments of the present invention.

FIG. 1 is a cross-sectional view of an in-wheel motor system 100 coupled with a clutch C for an in-wheel motor M according to an exemplary embodiment of the present invention, FIG. 2 is a view showing a state in which the clutch C for the in-wheel motor is coupled according to embodiments of the present invention, and FIG. 3 is a view showing a state in which the clutch C for the in-wheel motor is released according to embodiments of the present invention.

Referring to FIGS. 1 to 3, the clutch C for the in-wheel motor according to embodiments of the present invention includes a hub bearing 10 coupled to a driving wheel (not illustrated) and integrally rotated therewith, and formed in a cylindrical shape to provide a seating space 11 therein. A drive shaft 20 is positioned in the seating space 11 in a state of being spaced apart from an inner circumferential surface of the hub bearing 10, connected to a driving part M and R so as to be rotated by rotational force of the driving part M and R, and having a contact part 21 provided on an outer circumferential surface of a first end of the drive shaft 20 extended in a longitudinal (X) direction. The driving part M and R refers to the motor M and a speed reducer R. A plurality of linings 30 are positioned inside the seating space 11 on an outer side of the contact part 21 and movably coupled to the hub bearing 10 in a circumferential direction.

In the case of an in-wheel system that individually drives each of driving wheels (not illustrated), the driving part M and R generating a driving force is individually provided for each of the driving wheels (not illustrated), and may be rotated in a state of being fixed to a base B of the driving wheel (not illustrated).

Here, the driving part M and R may include the electrically driven motor M, the speed reducer R, and a separate driving device (i.e., engine, etc.) generating the driving force.

In the driving part M and R, the speed reducer R or a transmission, which are connected to an output shaft of the motor M to vary the number of revolutions, may be further included. The drive shaft 20 may be connected to the output shaft of the speed reducer R rotated by the output shaft of the motor M.

The hub bearing 10 is configured to rotate integrally with the driving wheel (not illustrated), and may be coupled to a wheel rim of the driving wheel (not illustrated) to rotate simultaneously with the driving wheel (not illustrated).

The hub bearing 10 may be selectively connected to the drive shaft 20. The hub bearing 10 transmits driving force of the drive shaft 20 to the driving wheel (not illustrated) in a state of connecting to the drive shaft 20, or may transmit braking force acting on the driving wheel (not illustrated) to the drive shaft 20.

In addition, as illustrated in FIG. 3, the hub bearing 10 is separated from the drive shaft 20, whereby the driving force of the drive shaft 20 may be blocked not to be transmitted to the driving wheel (not illustrated).

The hub bearing 10 is formed in a hollow cylindrical shape, and the seating space 11 may be provided therein. In the seating space 11, the contact part 21 may be provided at a first end of the drive shaft 20 and may be disposed to be spaced apart from the inner circumferential surface of the hub bearing 10.

The drive shaft 20 is extended in the longitudinal (X) direction, the first end thereof may be inserted into the seating space 11 inside the hub bearing 10, and a second end thereof may be connected to the driving part M and R.

The contact part 21 may be provided at the first end of the drive shaft 20. The outer circumferential surface of the contact part 21 may be spaced apart from the inner circumferential surface of the hub bearing 10.

According to embodiments herein, the contact part 21 may be produced separately from the drive shaft 20, or the contact part 21 may be inserted into the first end of the drive shaft 20 in a direction of a rotation axis to be spline-coupled and to rotate together with the drive shaft 20. In another exemplary embodiment, the contact part 21 may be integrally provided with the drive shaft 20.

The plurality of linings 30 are positioned inside the seating space 11, and in particular, may be positioned between the outer circumferential surface of the contact part 21 and the inner circumferential surface of the hub bearing 10. In particular, the plurality of linings 30 may be slidable outward or inward between the outer circumferential surface of the contact part 21 and the inner circumferential surface of the hub bearing 10.

In particular, as being coupled to the hub bearing 10 to be movable in the circumferential direction, the plurality of linings 30 may be coupled to rotate simultaneously by rotation of the hub bearing 10.

In addition, as the plurality of linings 30 are moved in the circumferential direction, frictional force between the contact part 21 and the plurality of linings 30 may be generated or removed depending on the movement direction and placement of the linings 30. As the plurality of linings 30 contacts the outer circumferential surface of the contact part 21, frictional force between the plurality of linings 30 and the contact part 21 may be applied. In addition, as the plurality of linings 30 is spaced apart from the outer circumferential surface of the contact part 21, the frictional force between the plurality of linings 30 and the contact part 21 may be removed.

That is, as illustrated in FIG. 3, when the plurality of linings 30 are slid outward in a radial direction to be spaced apart from the outer circumferential surface of the contact part 21, the connection between the drive shaft 20 and the hub bearing 10 is blocked, or removed. Whereas when the plurality of linings 30 are in contact with the outer circumferential surface of the contact part 21, a connection with the hub bearing 10 is made, whereby the drive shaft 20 and the hub bearing 10 is rotated at the same time. In addition, an instance of slipping may occur between the inner circumferential surfaces of the plurality of linings 30 and the outer circumferential surface of the contact part 21.

The centrifugal force generated by the rotation of the hub bearing 10 may act on the plurality of linings 30 coupled to the hub bearing 10, and accordingly, by being slid outward by the centrifugal force, the plurality of linings 30 may be spaced apart by a space 25 from the outer circumferential surface of the contact part 21.

Therefore, there is an effect in that, as the plurality of linings 30 are slid, the clutch C (i.e., decoupler) that connects or blocks the transmission of the driving force between the drive shaft 20 and the hub bearing 10 may be mechanically implemented.

Particularly, in a section where the hub bearing 10 rotates at high speed, by being spaced apart from the contact part 21 by the centrifugal force, the hub bearing 10 and the drive shaft 20 may be decoupled in the high-speed driving state.

In the interior of the seating space 11, the plurality of linings 30 may be capable of transitioning between a state in which the inner circumferential surfaces thereof are in contact with the outer circumferential surface of the contact part 21 and a state in which the contact therebetween is released.

The plurality of linings 30 are coupled to the hub bearing 10 to be slidable in the radial direction in the seating space 11. When being slid inward as centrifugal force diminishes at lower speeds, or in a start-up or low-speed state, the inner circumferential surfaces of the plurality of linings 30 may be in contact with the outer circumferential surface of the contact part 21. Whereas, when being slid outward, the inner circumferential surfaces of the plurality of linings 30 may be spaced apart from the outer circumferential surface of the contact part 21. A friction pad may be provided on the inner circumferential surfaces of the plurality of linings 30.

For example, the static friction coefficient between the friction pad and the outer circumferential surface of the contact part 21 may be 0.4 or more.

The inner circumferential surfaces of the plurality of linings 30 may be in a curved shape to correspond to an outer circumferential surface of the contact part 21 so that the parts may be in surface contact with each other when the plurality of linings 30 contact the outer circumferential surface of the contact part 21.

The contact part 21 has a cross section in a ring shape, and may have a cylindrical shape extended along the longitudinal direction of the drive shaft 20. That is, the outer circumferential surface of the contact part 21 may have a circular cross section.

As noted, the inner circumferential surfaces of the plurality of linings 30 may have a cross section formed to be a part of an arc, and may be bent to have the same curvature as that of the outer circumferential surface of the contact part 21. Accordingly, when the plurality of linings 30 are slid inward to be in contact with the outer circumferential surface of the contact part 21, the inner circumferential surfaces of the plurality of linings 30 may be in surface contact with the outer circumferential surface of the contact part 21, thereby having an effect of increasing frictional force caused by the contact therebetween.

Each of a plurality of connection links 50 may be further included, wherein a first end is rotatably coupled to the hub bearing 10 and a second end extended to the seating space 11 is rotatably coupled to each of the plurality of linings 30.

Each first end of the connection links 50 is rotatably coupled to the hub bearing 10, and each second end of the connection links 50 may be rotatably coupled to each of the linings 30. As each connection link 50 is rotatably coupled to the hub bearing 10, the linings 30 may be rotated at the same time together with the hub bearing 10, and by the rotation of the hub bearing 10, the centrifugal force may act on the linings 30 in the outward direction causing the linings 30 to slide outward.

The plurality of linings 30 and the plurality of connection links 50 may be disposed to be spaced out at equal intervals along the circumferential direction of the hub bearing 10.

As illustrated, the plurality of linings 30 may be disposed including eight linings being spaced out at intervals of substantially 45 degrees, and the plurality of connection links 50 may be rotatably coupled respectively to the linings 30. The plurality of linings 30 may include various numbers of linings other than the eight.

Each second end of the plurality of connection links 50 may be obliquely extended in the reverse direction of the driving direction of the drive shaft 20 (i.e., an illustrated arrow direction) with respect to a direction from each first end of the plurality of connection links 50 toward the rotation axis of the drive shaft 20.

As illustrated, the driving direction (i.e., the arrow direction) of the drive shaft 20 is counterclockwise, and accordingly, the rotational direction of the hub bearing 10 may also be counterclockwise. The connection link 50 is extended inward from the first end thereof to the second end thereof, and may be obliquely extended in the reverse direction of the driving direction of the drive shaft 20 with respect to the direction toward the rotation axis of the drive shaft 20.

In particular, relative to the second end of the connection link 50 coupled to the lining 30 as a reference point, the first end of the connection link 50 may be obliquely extended in the driving direction of the drive shaft 20 with respect to the radial direction of the drive shaft 20.

In addition, each first end of the plurality of connection links 50 may be coupled to the hub bearing 10 at a position where each first end of the plurality of connection links 50 is relatively moved along the driving direction (i.e., the arrow direction) of the drive shaft 20 or the rotational direction of the hub bearing 10 with respect to each second end of the plurality of connection links 50.

In other words, the connection link 50 is extended toward the inside of the hub bearing 10, wherein, relative to each first end of the connection link 50 as a reference point, the second end of the plurality of connection links 50 may be obliquely extended in a state of being rotated in the rotational direction of the drive shaft 20 or the hub bearing 10 with respect to the direction toward the rotation axis of the drive shaft 20.

That is, the connection link 50 is extended in a direction in which the rotation of the drive shaft 20 is blocked, thereby allowing the lining 30 rotatably coupled to the second end of the connection link 50 to block the rotation of the drive shaft 20.

Accordingly, the lining 30 generates a moment of inertia in the reverse direction (i.e., clockwise) of the direction in which the drive shaft 20 rotates, and the lining 30 is clamped to the contact part 21, thereby generating a self-servo effect and a wedge effect.

That is, as torque of the drive shaft 20 increases, stronger pressure is generated between the lining 30 and the outer circumferential surface of the contact part 21, thereby increasing the frictional force.

Accordingly, the driving force of the drive shaft 20 may be transmitted to the hub bearing 10 without slipping.

Conversely, in the direction opposite to the driving direction (i.e., the arrow direction) of the drive shaft 20, the self-servo effect and the wedge effect are not generated. Therefore, the torque acting in the driving direction (i.e., the arrow direction) of the drive shaft 20 is transmitted to the hub bearing 10, but on the contrary, the torque acting in the reverse direction of the driving direction (i.e., the arrow direction) is not transmitted to the hub bearing 10.

Accordingly, by using a separate power source or other driving wheel (not illustrated), the hub bearing 10 may be rotated at a relatively higher speed than the drive shaft 20, and in this case, because friction loss by the drive shaft 20 does not occur when the hub bearing 10 is not connected to the drive shaft 20, there is an effect of increasing fuel efficiency.

In addition, high-frequency noise generated when the drive shaft 20 rotates above an allowable speed is removed, thereby improving NVH (Noise, Vibration, and Harshness) performance.

In addition, even when a wheel lock phenomenon occurs due to a malfunction of the in-wheel motor M, the torque is not transmitted in the direction opposite to the driving direction of the drive shaft 20, thereby preventing a vehicle from being overturned due to yaw rotation, and increasing fail-safe performance.

An elastic body 40 configured to apply elastic force to the plurality of linings 30 in a direction moving toward the drive shaft 20 may be further included.

In embodiments, the elastic body 40 is positioned inside the seating space 11, and while surrounding the plurality of linings 30 from outside, the elastic body 40 may apply elastic force inward to the plurality of linings 30.

That is, the elastic body 40 is a coil spring surrounding the plurality of linings 30 from the outside, and may press the plurality of linings 30 inward at the same time. The inner circumferential surfaces of the plurality of linings 30 are in contact with the contact part 21 by the elastic force of the elastic body 40, whereby frictional force may be generated.

Therefore, when the elastic force of the elastic body 40 is greater than the centrifugal force of the lining 30, the lining 30 and the contact part 21 are in contact with each other, and thus the driving force of the drive shaft 20 is transmitted to the hub bearing 10.

However, as illustrated in FIG. 3, when the speed of the hub bearing 10 is increased and the centrifugal force of the lining 30 is greater than the elastic force of the elastic body 40, the lining 30 is slid toward the outside, and the inner circumferential surface of the lining 30 may be spaced apart from the outer circumferential surface of the contact part 21, whereby the power transmission between the drive shaft 20 and the hub bearing 10 may be blocked.

For example, the elastic force of the elastic body 40 may be adjusted so that the speed configured to block the power transmission between the drive shaft 20 and the hub bearing 10 is set to be the speed of the hub bearing 10, which is a vehicle speed of substantially 100 km per hour. The speed of the hub bearing 10 may predetermined and adjusted to different speeds depending on the mechanics of the parts used and desire of the system designer.

Accordingly, the driving speed of the vehicle may be mechanically controlled so that the vehicle is driven by 4WD when driving at a speed less than the predetermined speed (e.g., 100 km/h), and is driven by 2WD when driving at a speed higher than the predetermined speed.

Figure 4:
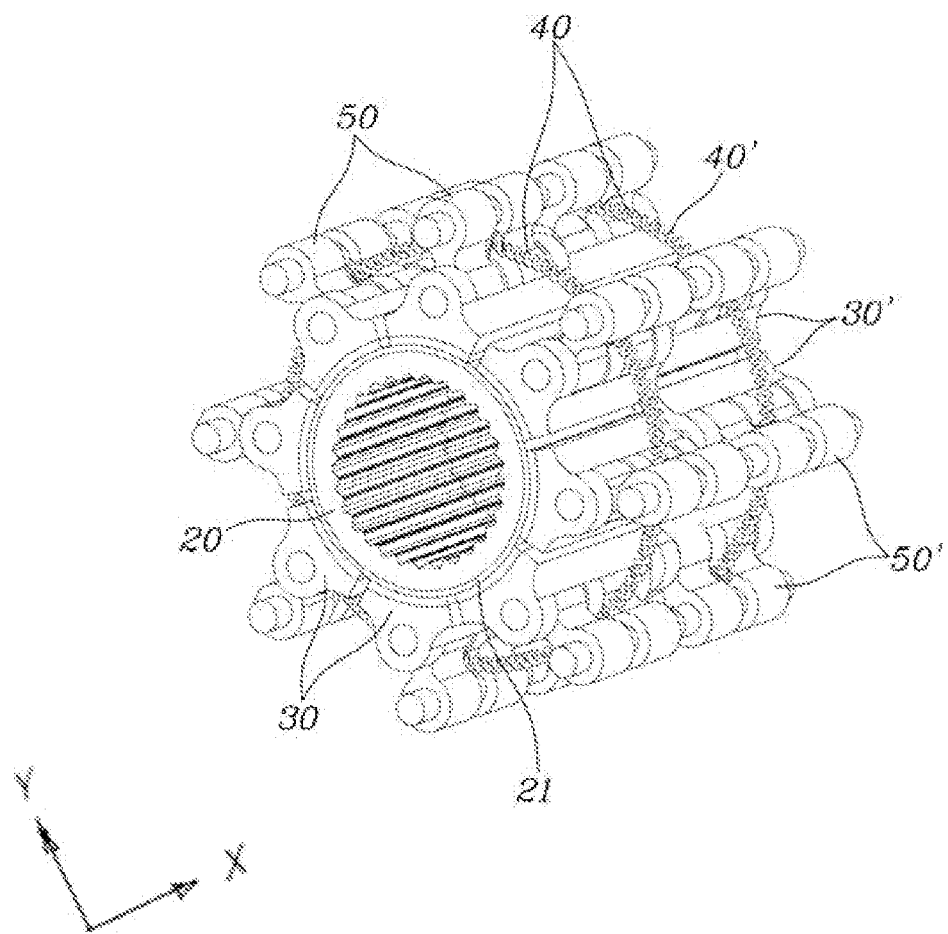
FIG. 4 is a perspective view illustrating an inner space for a hub bearing in the clutch for the in-wheel motor in which the hub bearing is removed, according to embodiments of the present invention.
Figure 5:
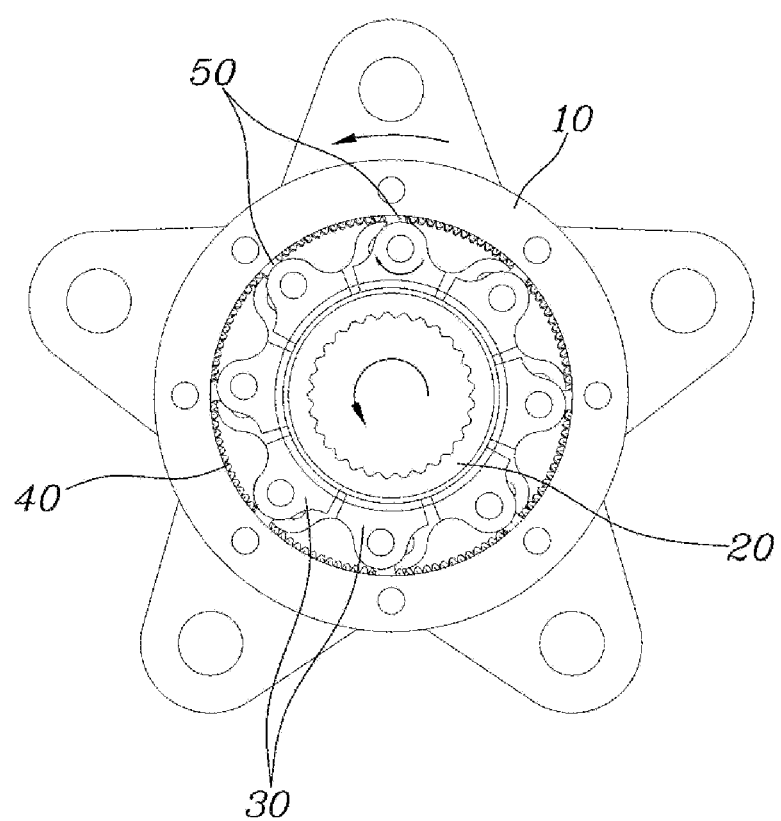
FIG. 5 is a plan view illustrating a rear surface of the clutch for the in-wheel motor according to embodiments of the present invention.

FIG. 4 is a perspective view illustrating an inner space for a hub bearing in the clutch for the in-wheel motor in which the hub bearing is removed, according to embodiments of the present invention, and FIG. 5 is a plan view illustrating a rear surface of the clutch for the in-wheel motor according to embodiments of the present invention.

Referring further to FIGS. 4 and 5, each of the plurality of connection links 50 may include a first connection link 50 and a second connection link 50', which are obliquely extended respectively from each of the first ends to each of the second ends in opposite directions with respect to a direction toward the rotation axis of the drive shaft 20.

In particular, the first connection link 50 and the second connection link 50' may be disposed to be spaced apart from each other in the longitudinal (X) direction in which the drive shaft 20 is extended.

By the second connecting link 50' which is obliquely extended in a direction opposite to the first connection link 50, there occurs an effect in that the torque acting in the opposite direction (i.e., an arrow) to the driving direction of the drive shaft 20 is transmitted to the hub bearing 10.

Due to the characteristics of the motor M, the motor M may be driven in both forward and reverse directions, and regenerative braking is made possible by input driving force. Accordingly, as the second connection link 50' is further included, reverse driving (i.e., driving backward) of a vehicle according to the driving of the drive shaft 20 in a reverse direction may be realized. In addition, there is an effect in that regenerative braking through the driving part M and R is realized.

Even in this case, in a high-speed driving situation in which the centrifugal force acting on the plurality of linings 30 is greater than the elastic force, the plurality of linings 30 is slid outward so that the inner circumferential surfaces of the plurality of linings 30 are spaced apart from the outer circumferential surface of the contact part 21, whereby the torque in the driving direction or the torque in the opposite direction of the drive shaft 20 is blocked instead of being transmitted to the hub bearing 10.

Here, the plurality of linings 30 may be integral-type linings, which are unseparated by way of extension along the direction in which the drive shaft 20 is extended.

In another embodiment, the plurality of linings 30 include a first lining 30 and a second lining 30', and the first lining 30 and the second lining 30' may be disposed in the longitudinal (X) direction in which the drive shaft 20 is extended.

The plurality of linings 30 may be extended in the longitudinal direction in which the drive shaft 20 is extended, and may be distinguished by the first lining 30 and the second lining 30', which are separated by a certain length in the longitudinal direction.

The clutch for the in-wheel motor may further include the first connection link 50 each having the first end rotatably coupled to the hub bearing 10 and having the second end extended to the seating space 11 and rotatably coupled to each of the first lining 30 and the second connection link 50' disposed to be spaced out in the direction in which the first connection link 50 and the drive shaft 20 are extended, each having the first end rotatably coupled to the hub bearing 10, and having the second end extended to the seating space 11 and rotatably coupled to each of the second linings 30'.

That is, each of the plurality of connection links 50 includes the first connection link 50 and the second connection link 50'. The first connection link 50 may be coupled to the first lining 30, and the second connection link 50' may be coupled to the second lining 30'.

The first connection link 50 and the second connection link 50' may be coupled to the hub bearing 10 at the same position, or may be respectively coupled to the hub bearing 10 at positions spaced apart from each other in the circumferential direction.

Each second end of the first connection links 50 may be obliquely extended in the reverse direction of the driving direction of the drive shaft 20 with respect to a direction from each first end of the first connection links 50 toward the rotation axis of the drive shaft 20, and each second end of the second connection links 50' may be obliquely extended in the driving direction of the drive shaft 20 with respect to the directions from each first end of the second connection links 50' toward the rotation axis of the drive shaft 20.

As described herein, the second end of the first connection link 50 may be obliquely extended in the reverse direction of the driving direction of the drive shaft 20 with respect to the direction from the first end of the first connection link 50 toward the rotation axis of the drive shaft 20.

Conversely, the second end of the second connection link 50' may be obliquely extended in the driving direction of the drive shaft 20 with respect to the direction from the first end of the second connection link 50' toward the rotation axis of the drive shaft 20.

In the second connection link 50', the torque (i.e., the arrow) in the reverse direction of the driving direction (i.e., forward direction) of the drive shaft 20 is transmitted to the hub bearing 10, so that reverse rotation (the arrow) of the driving part M and R and regenerative braking of the hub bearing 10 are made possible.

Here, the elastic body 40 configured to apply the elastic force to the plurality of lining 30 is also positioned by being spaced apart from each other in the direction in which the drive shaft 20 is extended, and may include a first elastic body 40 configured to apply elastic force to the plurality of first linings 30 and a second elastic body 40' configured to apply elastic force to the plurality of second linings 30'.

Figure 6:
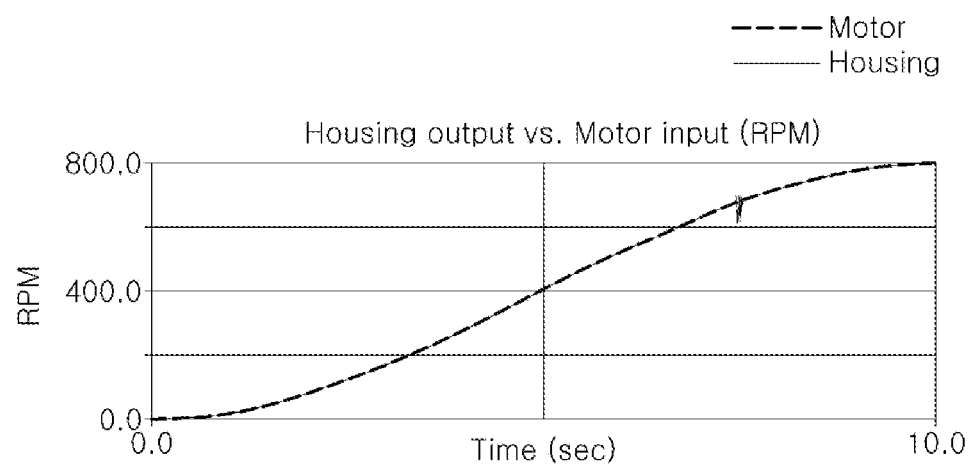
FIG. 6 is a graph illustrating rotational speed of a drive shaft of the clutch for the in-wheel motor and rotational speed of the hub bearing according to embodiments of the present invention.
Figure 7:
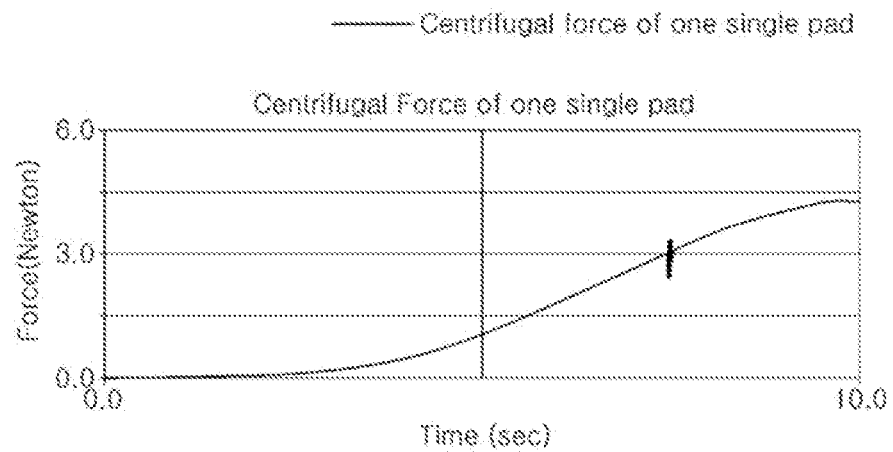
FIG. 7 is a view illustrating centrifugal force acting on linings of the clutch for the in-wheel motor according to embodiments of the present invention.

FIG. 6 is a graph illustrating rotational speed of the drive shaft of the clutch for the in-wheel motor and rotational speed of the hub bearing according to embodiments of the present invention, and FIG. 7 is a view illustrating centrifugal force acting on the linings of the clutch for the in-wheel motor according to embodiments of the present invention.

More particularly, FIGS. 6 and 7 are views illustrating an increase of the rotational speed of the drive shaft 20 over time in the clutch for the in-wheel motor according to embodiments of the present invention.

As illustrated in FIG. 6, as the rotational speed of the drive shaft 20 increases, the rotational speed of the hub bearing 10 may be continuously increased without slipping. That is, it may be confirmed that, by contacting the plurality of linings 30, the hub bearing 10 transmits power by way of following the rotational speed of the drive shaft 20 without slipping.

In addition, as illustrated in FIG. 7, the centrifugal force acting on the individual lining 30 continuously increases as the rotational speeds of the hub bearing 10 and the drive shaft 20 increase. Accordingly, it may be confirmed that the contact between the plurality of linings 30 and the drive shaft 20 may be released as the magnitude of the centrifugal force acting on the plurality of linings 30 is increased more than that of the elastic force of the elastic body 40.

Although a preferred embodiment of the present invention has been described for illustrative purposes, those skilled in the art will appreciate that various modifications, additions and substitutions are possible, without departing from the technical scope and spirit of the invention as disclosed in the accompanying claims.

What is claimed is:

1. A clutch for an in-wheel motor, the clutch comprising:
    a hub bearing coupled to a driving wheel and integrally rotated therewith, the hub bearing formed in a cylindrical shape to provide a seating space therein;
    a drive shaft positioned in the seating space in a state of being spaced apart from an inner circumferential surface of the hub bearing, the drive shaft connected to a driving part to be rotated by rotational force of the driving part, and provided with a contact part on an outer circumferential surface of a first end of the drive shaft extended in a longitudinal direction; and
    a plurality of linings positioned inside the seating space on an outer side of the contact part and coupled to the hub bearing to be movable in a circumferential and radial direction.

2. The clutch of claim 1, wherein, in the seating space, the plurality of linings is capable of transitioning between a state in which inner circumferential surfaces thereof are in contact with an outer circumferential surface of the contact part and a state in which the contact therebetween is released.

3. The clutch of claim 1, wherein inner circumferential surfaces of the plurality of linings are bent to correspond to an outer circumferential surface of the contact part so as to be in surface contact when contacting the outer circumferential surface of the contact part.

4. The clutch of claim 1, further comprising:
    a plurality of connection links each having a first end rotatably coupled to the hub bearing and having a second end extended to the seating space and rotatably coupled to each of the plurality of linings.

5. The clutch of claim 4, wherein the plurality of linings and the plurality of connection links are disposed to be spaced out at equal intervals along the circumferential direction of the hub bearing.

6. The clutch of claim 4, wherein each second end of the plurality of connection links is obliquely extended in a reverse direction of a driving direction of the drive shaft with respect to a direction from each first end of the plurality of connection links toward a rotation axis of the drive shaft.

7. The clutch of claim 4, wherein the plurality of connection links is coupled to the hub bearing at positions where each first end of the plurality of connection links is relatively moved along a driving direction of the drive shaft or a rotational direction of the hub bearing with respect to each second end of the plurality of connection links.

8. The clutch of claim 4, wherein the plurality of connection links includes a first connection link and a second connection link, which are obliquely extended respectively from each of the first ends to each of the second ends in opposite directions with respect to a direction toward a rotation axis of the drive shaft.

9. The clutch of claim 8, wherein the first connection link and the second connection link are disposed to be spaced apart from each other in the longitudinal direction in which the drive shaft is extended.

10. The clutch of claim 1, further comprising:
    an elastic body applying elastic force to the plurality of linings in a direction moving toward the drive shaft.

11. The clutch of claim 10, wherein the elastic body is positioned inside the seating space and applies the elastic force inward to the plurality of linings while surrounding the plurality of linings from outside.

12. The clutch of claim 1, wherein
    the plurality of linings includes a first lining and a second lining, and
    the first lining and the second lining are disposed in the longitudinal direction in which the drive shaft is extended.

13. The clutch of claim 12, further comprising:
    a first connection link having a first end rotatably coupled to the hub bearing and having a second end extended to the seating space and rotatively coupled to the first lining; and
    a second connection link disposed to be spaced apart from the first connection link in the longitudinal direction in which the drive shaft is extended, the second connection link having a first end rotatably coupled to the hub bearing, and
    having a second end extended to the seating space and rotatably coupled to the second lining.

14. The clutch of claim 13, wherein
    the second end of the first connection link is obliquely extended in a reverse direction of a driving direction of the drive shaft with respect to a direction from the first end of first connection link toward a rotation axis of the drive shaft, and
    the second end of the second connecting link is obliquely extended in the driving direction of the drive shaft with respect to a direction from the first end of second connecting link toward the rotation axis of the drive shaft.

* * * * *